(12) United States Patent
Nishii et al.

(10) Patent No.: US 6,478,385 B2
(45) Date of Patent: Nov. 12, 2002

(54) HYDRAULIC BRAKE APPARATUS FOR A VEHICLE

(75) Inventors: Michiharu Nishii, Toyota (JP); Takashi Kurokawa, Nagoya (JP); Satoshi Ishida, Chiryu (JP); Masaki Oishi, Toyota (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/893,403

(22) Filed: Jun. 29, 2001

(65) Prior Publication Data

US 2002/0000751 A1 Jan. 3, 2002

(30) Foreign Application Priority Data

Jun. 30, 2000 (JP) ........................................ 2000-197968

(51) Int. Cl.[7] ................................................. B60T 8/44
(52) U.S. Cl. .................. 303/114.1; 303/155; 303/115.4; 303/116.1; 303/113.1
(58) Field of Search ............................ 303/122, 122.09, 303/113.3, 113.4, 114.1, 114.2, 115.1, 155.4, 115.5, 116.1, 116.4, 117.1, 119.1

(56) References Cited

U.S. PATENT DOCUMENTS

| | | | | |
|---|---|---|---|---|
| 3,910,645 A | * | 10/1975 | Takeuchi et al. ............... 303/10 |
| 3,942,844 A | * | 3/1976 | Inada et al. ............... 303/114.1 |
| 4,415,210 A | * | 11/1983 | Belart et al. ............... 303/114.1 |
| 4,416,491 A | * | 11/1983 | Belart et al. ............... 303/114.1 |
| 4,440,454 A | * | 4/1984 | Belart et al. ................ 188/345 |
| 4,566,275 A | | 1/1986 | Farr |
| 4,743,071 A | * | 5/1988 | Iwamoto ....................... 188/353 |
| 4,807,942 A | * | 2/1989 | Belart ...................... 303/114.1 |
| 4,832,417 A | * | 5/1989 | Kehl et al. ................ 303/114.1 |
| 4,832,418 A | * | 5/1989 | Mattusch .................. 303/114.1 |
| 4,834,467 A | * | 5/1989 | Zirps ........................ 303/114.1 |
| 4,867,509 A | * | 9/1989 | Maehara ................... 303/113.3 |
| 4,900,103 A | * | 2/1990 | Stegmaier ................. 303/114.1 |
| 4,950,027 A | * | 8/1990 | Reinartz et al. .......... 303/113.3 |
| 5,029,951 A | | 7/1991 | Nishii |
| 5,098,172 A | * | 3/1992 | Maehara et al. ............. 188/358 |
| 5,112,115 A | * | 5/1992 | Willmann et al. ........... 188/358 |
| 5,531,509 A | * | 7/1996 | Kellner et al. ............... 188/358 |
| 5,899,068 A | | 5/1999 | Nishii et al. |
| 6,196,641 B1 | * | 3/2001 | Oka et al. ....................... 303/10 |
| 6,273,526 B1 | * | 8/2001 | Wachi et al. ................ 188/356 |

FOREIGN PATENT DOCUMENTS

| | | |
|---|---|---|
| JP | 58-71249 A | 4/1983 |
| JP | 2-95966 A | 4/1990 |
| JP | 9-315288 A | 12/1997 |

* cited by examiner

Primary Examiner—Jack Lavinder
Assistant Examiner—Devon Kramer
(74) Attorney, Agent, or Firm—Burns, Doane, Swecker & Mathis, LLP

(57) ABSTRACT

A vehicle hydraulic brake apparatus includes a brake member, a master cylinder generating a brake hydraulic pressure by increasing the pressure of brake fluid in a reservoir, a master piston moved forward in response to operation of the brake member, a closed chamber defined behind the master piston, a power piston disposed behind the master piston, and a power chamber defined behind the power piston. An auxiliary hydraulic pressure source generates power hydraulic pressure and a pressure regulating device connects the auxiliary hydraulic pressure source with the reservoir. The power hydraulic pressure is regulated to a predetermined hydraulic pressure and is fed to the power chamber. A normally-open type valve connects the closed chamber and the power chamber, and is closable upon operation of the brake member. The closed chamber is connected to the reservoir via the normally-open type valve, the power chamber and the pressure regulating device.

20 Claims, 9 Drawing Sheets

HYDRAULIC BRAKE APPARATUS FOR A VEHICLE

This application is based on and claims priority under 35 U.S.C. § 119 with respect to Japanese Patent Application No. 2000-197968, filed on Jun. 30, 2000, the entire content of which is incorporated herein by reference.

FIELD OF THE INVENTION

This invention generally relates to a hydraulic brake apparatus for a vehicle which feeds hydraulic brake pressure in wheel cylinders provided on each wheel of the vehicle. More particularly, the present invention pertains to a vehicle hydraulic brake apparatus for a vehicle that includes a master cylinder section, an auxiliary hydraulic pressure source and a pressure regulating device.

BACKGROUND OF THE INVENTION

A known hydraulic brake apparatus for an automobile is disclosed in U.S. Pat. No, 5,899,068, which corresponds to a Japanese Patent Application published as Toku-Kai-Hei 9 (1997)-315288. This known hydraulic brake apparatus includes a master cylinder, an auxiliary pressure source, and a pressure regulating valve section. The master cylinder piston is provided with a first piston connected to a brake operating member (brake pedal) and a second piston slidably disposed relative to the first piston. The master cylinder piston further includes an engaging portion for engaging the second piston with the first piston in response to forward movement of the second piston. The rear ends of the first piston and second piston are exposed to a power chamber, and the front ends of the first piston and the second piston are exposed to a pressure chamber. The master cylinder is assisted and activated by an output hydraulic pressure from the pressure regulating valve section in response to the operation of the brake operating member when an output hydraulic pressure supplied from the auxiliary pressure source is sufficient. On the other hand, the master cylinder is activated directly in response to operation of the brake operating member when the output hydraulic pressure supplied from the auxiliary pressure source is insufficient. Therefore, the known hydraulic brake apparatus can carry out an appropriate braking control only by the master cylinder even when sufficient power hydraulic pressure is not supplied. When the output hydraulic pressure is not sufficiently supplied from the auxiliary pressure source, only the first piston is moved forward. On the other hand, when sufficient output hydraulic pressure is supplied from the auxiliary pressure source, both the first and second pistons are moved forward. Therefore, when the output hydraulic pressure from the auxiliary pressure source is insufficient, an effective cross-sectional area of the master cylinder piston can be minimized compared with that when the output hydraulic pressure from the auxiliary pressure source is sufficient. Therefore, the hydraulic pressure in the pressure chamber can be sufficiently increased even when the output hydraulic pressure supplied from the auxiliary pressure source is not sufficient.

Additionally, the second piston is in the form of a cylindrical body, the front end of which is disposed in the pressure chamber and the rear end of which is disposed in the power chamber. The first piston is slidably received in a hollow portion of the cylindrical body forming the second piston. Therefore, the master cylinder piston, including the first and second pistons, is formed as a double-piston structure. A closed chamber is defined between the first and second pistons, and communicating holes connect the closed chamber to the pressure chamber or the power chamber. According to the communication between the closed chamber and the pressure chamber or the power chamber, a shock generated by separation or engagement of the first and second pistons in response to a sudden operation of the brake operating member can be minimized.

The pressure regulating valve included in the known hydraulic brake apparatus is constructed as a so-called regulator. Alternatively, a hydraulic pressure booster can be used as the pressure regulating valve. For example, according to U.S. Pat. No. 5,029,951 (corresponding to a Japanese Patent Application published as Toku-Kai-Hei 2 (1990)-95966), the hydraulic brake apparatus is provided with a hydraulic pressure booster for assisting the master cylinder to be activated in response to the brake pedal depression by using the output hydraulic pressure supplied from a power hydraulic pressure source (the auxiliary pressure source) as an assisting power source. The above-mentioned hydraulic brake apparatus includes a power piston and the master cylinder which have diameters different from each other and the closed chamber hydraulically connecting the power piston to the master cylinder. According to the above construction, the brake pedal stroke can be minimized. Further, the master cylinder can be activated directly by the brake pedal when the hydraulic pressure booster is unable to generate sufficient assisting pressure force.

The hydraulic pressure booster according to the Japanese Patent Application published as Toku-Kai-Hei 2 (1990)-95966 includes a one-way valve disposed between the power chamber of the hydraulic pressure booster and the closed chamber. When the hydraulic pressure booster cannot generate sufficient assisting pressure force, the power piston can be operatively connected to the master piston. Further, a check valve and a cup-like sealing member function as the one-way valve according to the above known hydraulic brake apparatus.

Further, the one-way valve is provided for allowing communication between the closed chamber and the power chamber in response to the pressure differential between the two chambers. However, the publication describing the known device does not disclose the details of the non-operated condition of the hydraulic brake apparatus. For example, under the non-operated condition, communication between the closed chamber and the power chamber is interrupted by the one-way valve formed by the cup-like sealing member or by a normally used check valve.

It is favorable if the communication between the closed chamber and the power chamber is established and the closed chamber is connected to a reservoir via the power chamber when the hydraulic brake apparatus is in the non-operated condition. Therefore, when the closed chamber is required to be filled with brake fluid, an evacuation of the air in the closed chamber can be carried out easily and accurately by air bleeding from an opening in a reservoir, maintaining the inside of the hydraulic brake apparatus at a high vacuum condition and transmitting pressured brake fluid to the closed chamber. However, the hydraulic pressure booster is provided with the check valve having a pressure for valve opening between the closed chamber and the power chamber. Therefore, brake pedal operation is required to carry out the air bleeding.

According to the hydraulic brake apparatus described in U.S. Pat. No. 5,899,068, the master cylinder including the first and second pistons is formed as a double-piston structure. The closed chamber is defined between the first and second pistons of the master cylinder piston. The closed chamber serves to minimize shock generated by separating or engaging the first and second pistons in response to a sudden operation of the brake operating member. Therefore, the closed chamber according to U.S. Pat. No. 5,899,068 serves a different function from that disclosed in U.S. Pat. No. 5,029,951. Further, the closed chamber according to U.S. Pat. No. 5,899,068 does not encounter as much difficulty in carrying out the air bleeding for filling the closed chamber with brake fluid.

SUMMARY OF THE INVENTION

According to one aspect of the invention, a hydraulic brake apparatus for a vehicle includes a brake operating member, a reservoir, a master cylinder for generating a brake hydraulic pressure by increasing the pressure of the brake fluid in the reservoir, a master piston moved forward in response to the brake operating member operation, a closed chamber defined behind the master piston, a power piston disposed behind the master piston and a power chamber defined behind the power piston. The hydraulic brake apparatus further includes an auxiliary hydraulic pressure source for generating a power hydraulic pressure by increasing the brake fluid up to a predetermined hydraulic pressure, and a pressure regulating device for connecting the auxiliary hydraulic pressure source with the reservoir. The output power hydraulic pressure of the auxiliary hydraulic pressure source is regulated to be set at the predetermined hydraulic pressure and is fed into the power chamber. A normally open-type valve connects the closed chamber and the power chamber, and is adapted to be closed in response to initiation of the brake operation. The closed chamber is connected to the reservoir via the normally-open type valve, the power chamber and the pressure regulating device.

According to another aspect of te invention, a hydraulic brake apparatus for a vehicle includes a brake operating member, a reservoir, a master piston movably positioned within a cylinder bore to move in response to operation of the brake operating member, a closed chamber located rearward of the master piston, a power piston disposed rearward of the master piston, a power chamber defined by the power piston and two sealing members, a passage connecting the power chamber and the closed chamber, and a pump connected to the reservoir to generate power hydraulic pressure by increasing the pressure of the brake fluid from the reservoir to a predetermined hydraulic pressure. A pressure regulating device is connected to the auxiliary hydraulic pressure source and to the reservoir to regulate the power hydraulic pressure from the auxiliary hydraulic pressure source to a predetermined hydraulic pressure and feed the regulated the power hydraulic pressure to the power chamber. A valve is located in the passage to close off the passage and interrupt communication between the power chamber and the closed chamber by way of the passage based on either movement of the power piston or a pressure differential between the power chamber and the closed chamber. The closed chamber is connected to the reservoir via the valve, the power chamber and the pressure regulating device.

In accordance with a further aspect of the invention, a hydraulic brake apparatus for a vehicle includes a brake operating member, a reservoir, a master piston movably positioned within a housing and movable in response to operation of the brake operating member, a closed chamber located rearward of the master piston, a power piston disposed rearward of the master piston, a power chamber defined by the power piston and in communication with the closed chamber by way of a communicating space, and a pump connected to the reservoir to generate power hydraulic pressure. A pressure regulating device is connected to the auxiliary hydraulic pressure source and to the reservoir to regulate the power hydraulic pressure from the auxiliary hydraulic pressure source to a predetermined hydraulic pressure and feed the regulated the power hydraulic pressure to the power chamber. A normally open valve is positioned to close the communicating space and interrupt communication between the power chamber and the closed chamber upon operation of the brake operating member.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements and wherein.

DETAILED DESCRIPTION OF THE INVENTION

Figure 1:
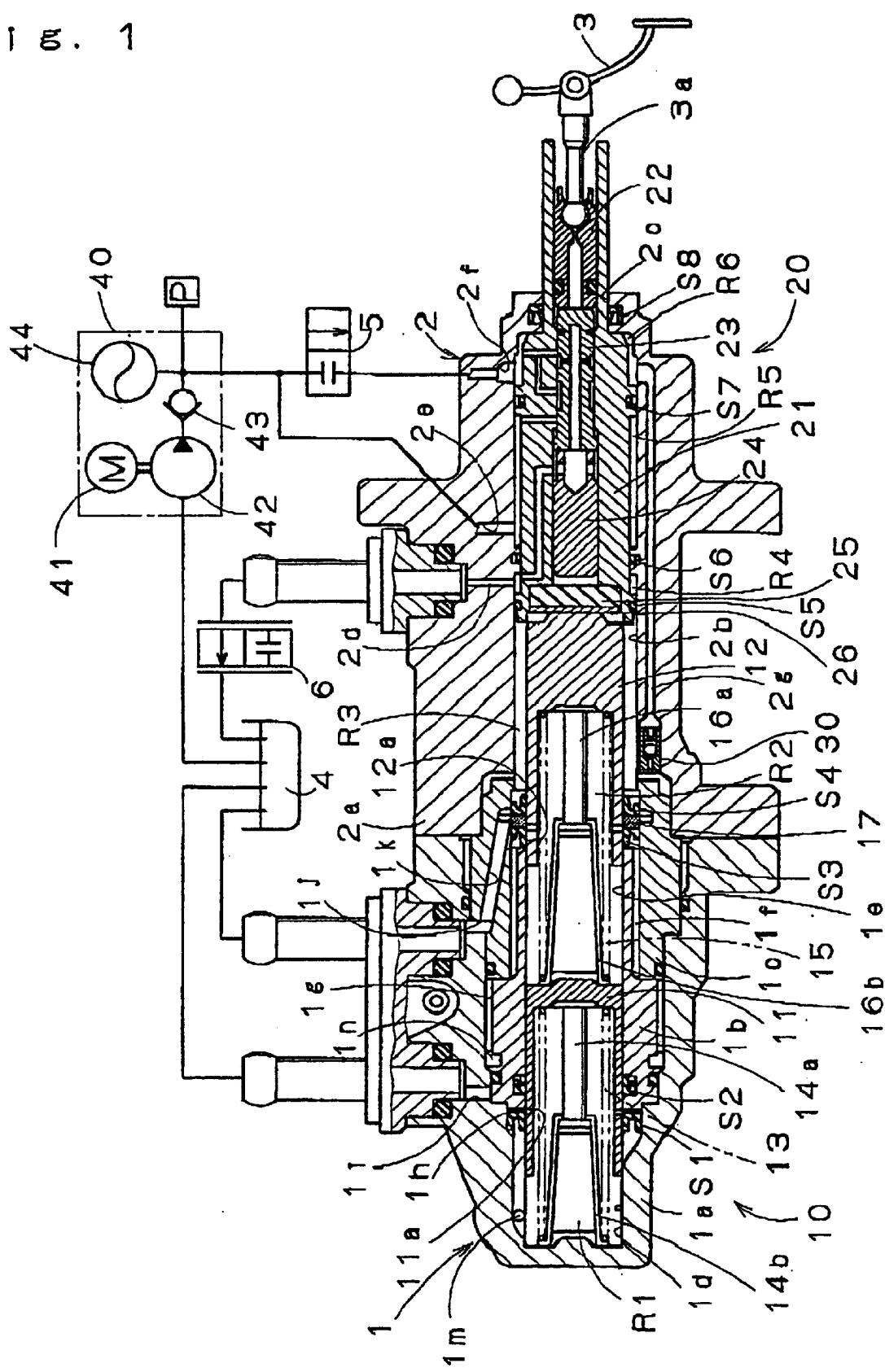
FIG. 1 is a cross-sectional view of a hydraulic brake apparatus according to a first embodiment of the present invention.
Figure 2:
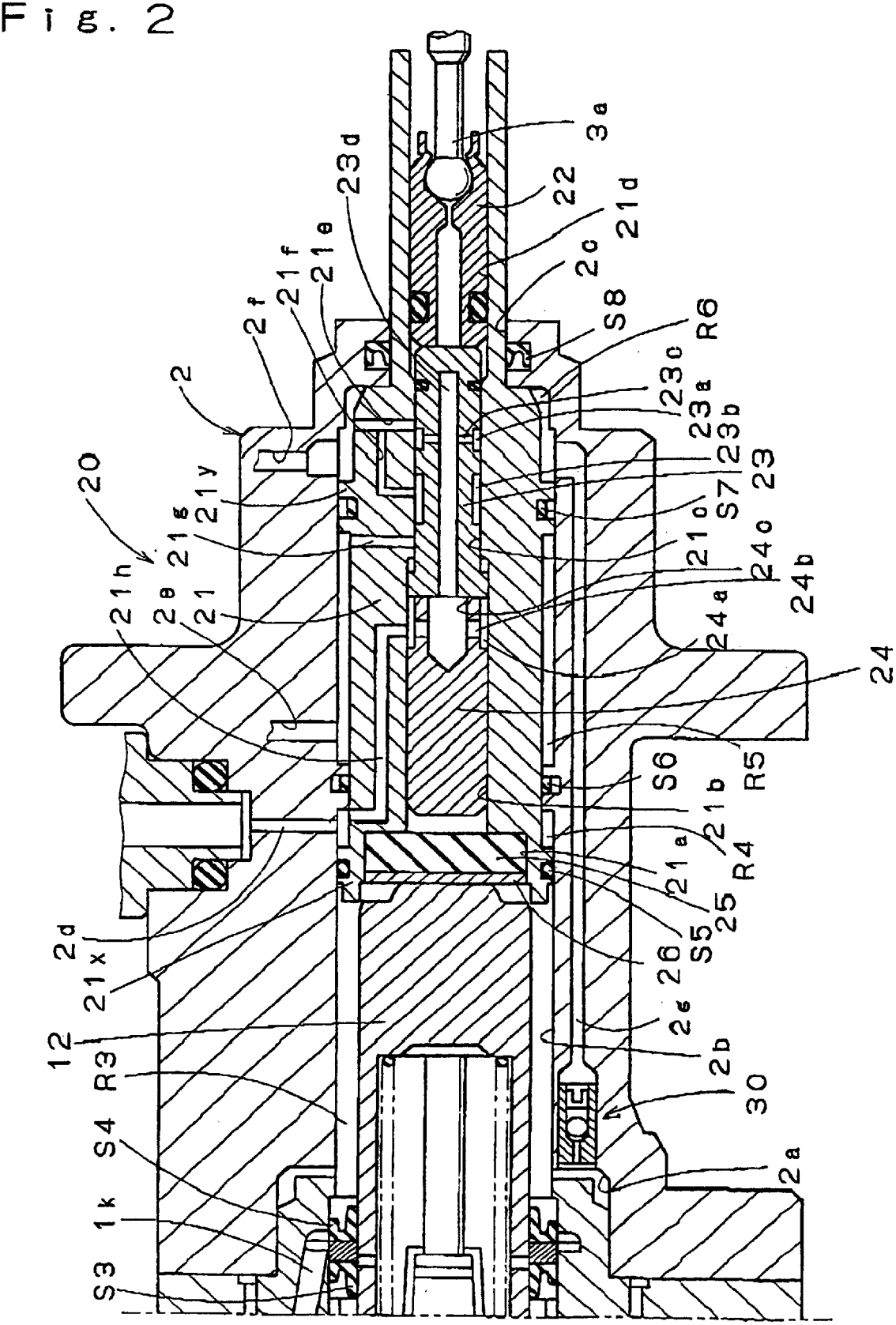
FIG. 2 is a cross-sectional view of a portion of the hydraulic pressure booster shown in FIG. 1 with the brake operation being inactive.

Referring to FIGS. 1 and 2, a hydraulic brake apparatus according to a first embodiment of the present invention includes a brake operating member (e.g., a brake pedal) 3 connected to an input rod 3a so that a depressing force applied to the brake pedal 3 is transmitted to the input rod 3a as a braking force. Corresponding to the braking force, a hydraulic brake pressure is outputted from a master cylinder 10 assisted by a hydraulic pressure booster 20 so as to be supplied to the various wheel cylinders which are each operatively associated with one of the wheels of the vehicle. FIG. 1 illustrates the overall structure of the hydraulic brake apparatus while FIG. 2 depicts an enlarged view of the hydraulic pressure booster 20 used in the hydraulic brake apparatus.

As shown in FIG. 1, according to the first embodiment of the present invention, a master cylinder housing 1 of a cylinder body is configured with a first cylinder 1a, a second cylinder 1b and a third cylinder 1c. A master cylinder 10 is disposed in the master cylinder housing 1 and forms a tandem brake master cylinder in which master pistons 11, 12 are accommodated in series. The first cylinder 1a has a closed bottom portion at one end and a stepped inner bore that gradually increases in diameter in a generally step-wise fashion from a cylinder bore 1d towards an opening portion of the first cylinder 1a. The cylinder bore 1d is defined between the first cylinder 1a and the master piston 11. A pair of fluid supply ports 1i, 1j and a pair of outlet ports 1m, 1n are defined in the first cylinder 1a.

The second cylinder 1b possesses an approximately cylindrical shape, with a cylinder bore 1e being defined within the second cylinder 1b. The cylinder bore 1e has the same diameter as that of the cylinder bore 1d. A hydraulic passage 1h is formed in the front end portion of the second cylinder 1b and is connected to the fluid supply port 1i in the first cylinder 1a. An annular cup-like sealing member S1 is disposed ahead of or in front of the hydraulic passage 1h and opens in the forward direction (i.e., the left direction in FIG. 1). On the other hand, an annular cup-like sealing member S2 is disposed behind or rearward of the hydraulic passage 1h and opens in the rearward direction (i.e., the right direction in FIG. 1).

The third cylinder 1c is disposed behind the second cylinder 1b and receives a rear portion of the second cylinder 1b. An annular hydraulic passage 1f is defined between the second cylinder 1b and the third cylinder 1c, and communicates with an annular hydraulic passage 1g defined between the first cylinder 1a and the second cylinder 1b. The outlet port 1n opens to the hydraulic passage 1g. A hydraulic passage 1k is defined at a side surface of the third cylinder 1c and communicates with the fluid supply port 1j. An annular member 17 is disposed at the opening portion of the hydraulic passage 1k.

A sealing member S3 is disposed ahead of or in front of the annular member 17 and opens in the forward direction, and a sealing member S4 is disposed behind or rearwardly of the annular member 17 and opens in the rearward direction. The annular member 17 is disposed between the sealing members S3, S4. An opening portion of the hydraulic passage 1f is arranged ahead of the sealing member S3 and an opening portion of the hydraulic passage 1k is arranged upward or outwardly of the sealing member S4. The master piston 11 having a closed bottom portion is accommodated in a fluid-tight and slidable manner within the cylinder bore 1d, whereby a first pressure chamber R1 is defined between the first cylinder 1a and the master piston 11. The master piston 12 is accommodated in the cylinder bore 1e and is supported in a fluid-tight and slidable manner by the annular member 17 and the sealing members S3, S4, whereby a second pressure chamber R2 is defined between the two master pistons 11, 12.

At the rear end position of the master piston 11 under the non-operated condition, the communicating hole 11a is formed on a skirt portion of the master piston 11 and faces the hydraulic passage 1h, wherein the first pressure chamber R1 communicates with a reservoir 4 through the fluid supply port 1i. Likewise, at the rear end position of the master piston 12 under the non-operated condition, a communicating hole 12a formed on a skirt portion of the master piston 12 faces the sealing member S3, wherein the second pressure chamber R2 communicates with the reservoir 4 through the hydraulic passage 1k and the fluid supply port 1j. Accordingly, the sealing member S3 serves for allowing the brake fluid to be fed from the hydraulic passage 1k to the pressure chamber R2 and blocking reverse brake hydraulic flow when the sealing member S3 is arranged at the aforementioned position in FIG. 1. The sealing member S4 allows the brake fluid to be fed from the hydraulic passage 1k to a closed chamber R3, described later, and blocks reverse brake hydraulic flow.

A spring 13 extends between the front end surface or closed bottom end of the first cylinder 1a and a recessed bottom surface or closed bottom end of the master piston 11. The master piston 11 is thus biased in the rearward direction. One end of a push rod 14a is fixed to the recessed bottom surface of the master piston 11 and the other end of the push rod 14a is engaged with the end portion of a retainer 14b. The rearward movement of the master piston 11 is thus restricted. In addition, a spring 15 extends between the rear end surface of the master piston 11 and a recessed bottom surface or closed bottom end of the master piston 12. The master piston 11 is urged in the forward direction and the master piston 12 is biased in the rearward direction. Therefore, the mater pistons 11, 12 are always urged in opposite directions away from each other.

One end of a push rod 16a is fixed to the recessed bottom surface of the master piston 12 and the other end of the push rod 16a is engaged with the end portion of a retainer 16b. The rearward movement of the master piston 12 is thus restricted.

The hydraulic pressure booster 20 is accommodated behind the master piston 12 through the closed chamber R3. The first cylinder 1a of the master cylinder housing 1 is fixed to a fourth cylinder 2a forming a booster housing 2. The fourth cylinder 2a has a bottom portion. A power piston 21 is positioned in a cylinder bore 2b of the fourth cylinder 2a in a fluid-tight and slidable manner. The cylinder bore 2b of the fourth cylinder 2a has a larger diameter than the diameter of the cylinder bores 1d, 1e. As shown in FIG. 2, a land portion 21x is formed ahead of or at the front portion of the power piston 21. A sealing member S5 is received in a groove in the land portion 21x. A land portion 21y is formed behind the power piston 21, and a sealing member S7 is received in a groove in the land portion 21y. A sealing member S6 is disposed on the inner surface of the cylinder bore 2b between the sealing members S5, S7. A sealing member S8 is disposed around the opening portion 2c at the bottom portion of the fourth cylinder 2a. Although the power piston 21 is divided into two parts for actually disposing the sealing members S5, S6, S7 in a manner illustrated in FIG. 2, the power piston 21 is illustrated as a single member.

According to the above-described construction, the closed chamber R3 is defined between the sealing members S4, S5, an annular drain chamber R4 is defined between the sealing members S5, S6, an annular fluid supply chamber R5 is defined between the sealing members S6, S7, and a power chamber R6 is defined between the sealing members S7, S8.

As illustrated in the slightly enlarged illustration of FIG. 2, defined within the power piston 21 are a recessed portion 21a, a large diameter cylinder bore 21b, a small diameter cylinder bore 21c, and a large diameter cylinder bore 21d. Also defined within the power piston 21 are a communicating hole 21h connecting the cylinder bore 21b to the drain chamber R4, a communicating hole 21g connecting the cylinder bore 21c to the fluid supply chamber R5, and communicating holes 21e, 21f connecting the cylinder bore 21c to the power chamber R6. A plunger 22 is positioned in the cylinder bore 21d in a fluid-tight and slidable manner, and is connected to the input rod 3a located behind the plunger 22. A first spool 23 is accommodated in a fluid-tight and slidable manner in the cylinder bore 21c ahead of the plunger 22.

A second spool 24 is also accommodated in a fluid-tight and slidable manner in the cylinder bore 21b that is defined ahead of the cylinder bore 21c. A reaction force disc 25 made of rubber is disposed in the recessed portion 21a as an elastic body for transmitting a reaction force. A metal plate 26 is firmly in contact with the reaction force disc 25 and is axially movable together. Under the non-operated condition shown in FIGS. 1 and 2, a slight clearance is defined between the reaction force disc 25 and a front end surface of the second spool 24.

Figure 3:
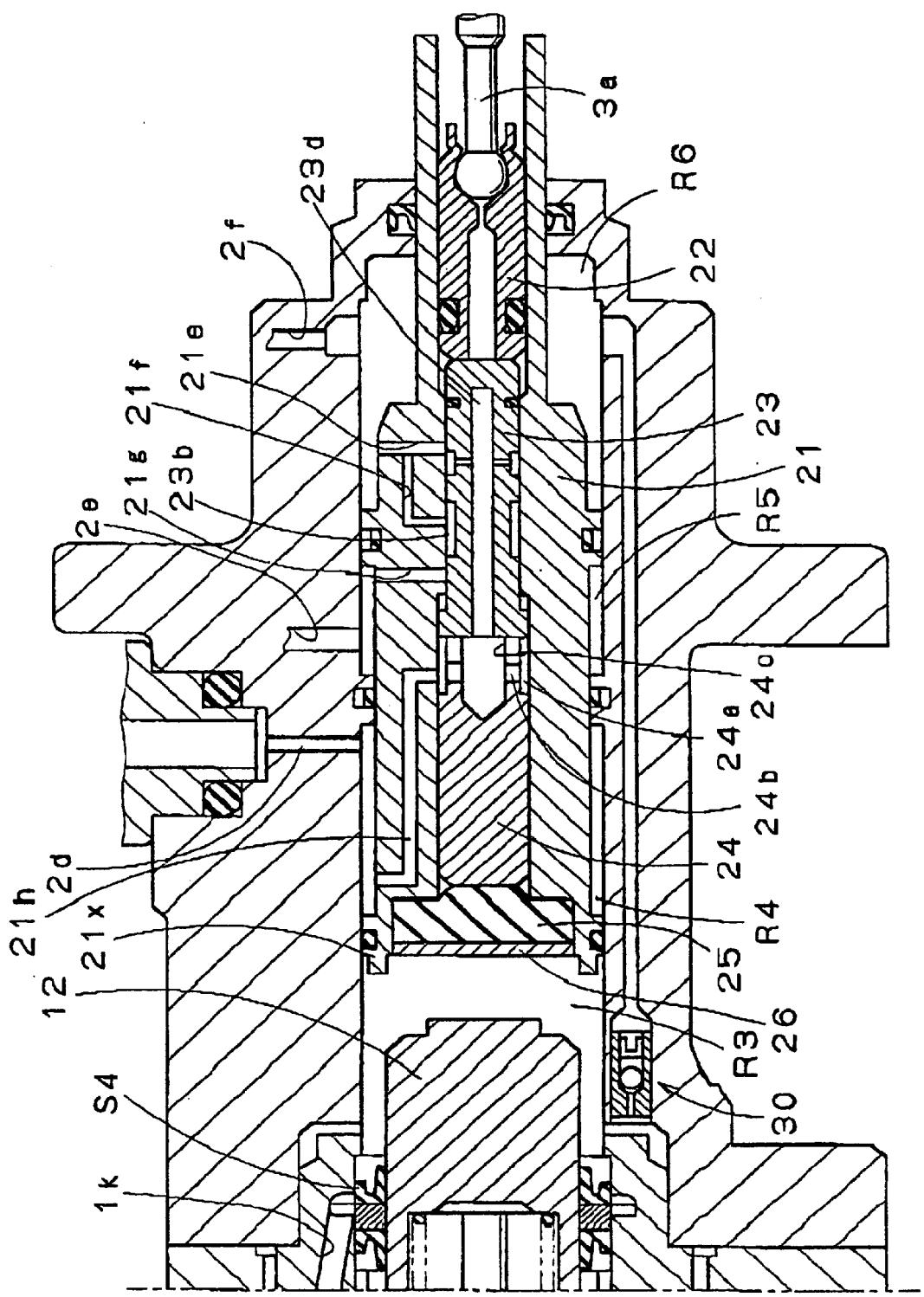
FIG. 3 is a cross-sectional view of a portion of the hydraulic pressure booster shown in FIG. 1 when it is active.

As shown in FIG. 2, two annular grooves 23a, 23b are defined on the outer periphery of the first spool 23. An axially extending hole 23d is defined on the outer periphery of the first spool 23 and opens in the forward direction. The hole 23d is connected to the annular groove 23a via a communicating hole 23c that is laterally defined in the first spool 23. Under the non-operated condition as shown in FIG. 2, the annular grooves 23a, 23b face the opening portion of the respective communicating holes 21e, 21f, wherein the power chamber R6 is connected to the hole 23d via the communicating hole 21e, the annular groove 23a and the communicating hole 23c. Upon the forward movement of the first spool 23, as shown in FIG. 3, the communication between the power chamber R6 and the hole 23d is interrupted. Instead of communication between the hole 23d and the power chamber R6 as shown in FIG. 2, the power chamber R6 is connected to the communicating hole 21g because the annular groove 23b faces the opening portions of the communicating holes 21f, 21g.

An annular groove 24a is defined on the outer periphery of the second spool 24 in the rearward direction with respect to the second spool 24. An axially extending hole 24c is located in the spool 24 and faces the opening portion of the hole 23d in the first spool 23. The hole 24c is connected to the annular groove 24a via a communicating hole 24b that is laterally defined in the spool 24. The hole 24c is further connected to the drain chamber R4 via the communicating hole 21h. Additionally, according to the first embodiment of the present invention as shown in FIGS. 2 and 3, the first spool 23 and the second spool 24 are in contact with each other and move together as one unit. As described below, the two spools can be separated from one another with a space defined between the two spools.

Three ports are defined in the booster housing 2 and include a drain port 2d always connected to the drain chamber R4, a fluid supply port 2e, and a fluid supply port 2f. As shown in FIG. 1, the drain port 2d is connected to the reservoir 4 through a normally-open type solenoid valve 6. The solenoid valve 6 is comprised of a proportioning valve to carry out fine brake control. The fluid supply ports 2e, 2f are connected to an auxiliary hydraulic pressure source 40 as shown in FIG. 1.

The auxiliary hydraulic pressure source 40 is provided with an electric motor 41 and a hydraulic pressure pump 42 driven by the motor 41. The input side of the hydraulic pressure pump 42 is connected to the reservoir 4 and the output side of the hydraulic pressure pump 42 is connected to an accumulator 44 through a check valve 43. The output side of the hydraulic pressure pump 42 is further connected to the fluid supply port 2e and is connected to the fluid supply port 2f through a normally-closed type solenoid valve 5. If the solenoid valve 5 is made of a proportioning valve as well as the solenoid valve 6, the solenoid valve 5 can effectively carry out a more fine brake control. A pressure sensor P is connected to the accumulator 44 to maintain the auxiliary hydraulic pressure source 40 at a predetermined output hydraulic pressure. As described above, the pressure regulating device of the present invention is disposed in the power piston 21.

A hydraulic passage or communicating space 2g is defined in the booster housing 2 and connects the closed chamber R3 to the power chamber R6. A pressure differential responsive check valve 30 (a check valve 30) is disposed in the hydraulic passage 2g. The check valve 30 normally establishes communication between the power chamber R6 and the closed chamber R3. The check valve 30 is operated for being closed in correspondence to the pressure differential between the power chamber R6 and the closed chamber R3. When the hydraulic pressure in the power chamber R6 is larger than that in the closed chamber R3 and when the pressure differential becomes equal to or greater than a predetermined value, the check valve 30 is operated to close, thus interrupting communication between the power chamber R6 and the closed chamber R3. On the other hand, during the non-operated condition, the check valve 30 is maintained in the open position because there is no pressure applied to the power chamber R6 and the closed chamber R3. Therefore, when the closed chamber R3 is required to be filled with brake fluid, an evacuation of the air in the closed chamber R3 can be carried out relatively easily and accurately by bleeding air from the power chamber R6.

The overall operation of the hydraulic brake apparatus constructed in the manner described above is as follows, referring to the various illustrations in FIGS. 1–7. An operated condition of the hydraulic pressure booster 20 of the hydraulic brake apparatus is illustrated in FIGS. 3–7. FIGS. 1 and 2 show the position of the various components forming the hydraulic brake apparatus when the brake pedal 3 is in the non-operated condition. Under the non-operated condition, the solenoid valve 5 is in the closed position and the solenoid valve 6 is in the open position. The rear end surface of the master piston 12 is in contact with the metal plate 26, and the hydraulic pressure booster 20 is in the non-operated condition. The closed chamber R3 is connected to the reservoir 4 through the check valve 30, the power chamber R6, the drain chamber R4 and the drain port 2d so as to be set at atmospheric pressure.

The fluid supply chamber R5 is connected to the accumulator 44 included in the auxiliary hydraulic pressure source 40. However, communication between the fluid supply chamber R5 and the power supply chamber R6 is interrupted by the first spool 23. That is, by virtue of the position of the first spool 23, communication of the communicating hole 21g and the groove 23b is prevented and so communication between the fluid supply chamber R5 and the power chamber R6 is not permitted.

The power chamber R6 is connected to the reservoir 4 through the communicating hole 21e, the groove 23a facing the hole 21e, the communicating hole 23c, the hole 23d of the first spool 23, the hole 24c of the second spool 24, the communicating hole 24b, the groove 24a, the communicating hole 21h of the power piston 21 and the drain port 2d. The power chamber R6 is further connected to the closed chamber R3 via the hydraulic passage 2g and the check valve 30. Accordingly, when the auxiliary hydraulic pressure source 40 is active, the power piston 21 is applied only with a rearward force by the hydraulic pressure of the fluid supply chamber R5. Therefore, the power piston 21 can be maintained at the position shown in FIG. 1 and FIG. 2, When the brake pedal operation is carried out, the first spool 23 is pushed forward by the forward movement of the plunger 22 and reaches the position shown in FIG. 3. Corresponding to the forward movement of the first spool 23, the communication between the communicating hole 21e and the groove 23a is interrupted, wherein communication between the power chamber R6 and the communicating hole 23d is interrupted. On the other hand, the annular groove 23b faces the opening portion of each of the communicating holes 21f, 21g. Therefore, power hydraulic pressure is fed into the power chamber R6 through the fluid supply port 2e, the communicating hole 21g, the annular groove 23b, and the communicating holes 21f, 21e. The power hydraulic pressure is fed into the fluid supply chamber R5 from the auxiliary hydraulic pressure source 40. Accordingly, a pushing pressure received by the annular area of the land portion 21y (forming a rearward pressure receiving surface) for biasing the power piston 21 in the rearward direction by the power hydraulic pressure of the fluid supply chamber R5, a pushing pressure received by an effective cross-sectional area of the power piston 21 by the power hydraulic pressure fed into the power chamber R6 corresponding to the brake pedal operation, and the brake pedal depressing force are balanced. Under the well-balanced condition of the three different pressures, when the pressure differential between the power chamber R6 and the closed chamber R3 becomes equal to or greater than the predetermined value, the hydraulic passage 2g is blocked with the check valve 30 being at the closed position, wherein the closed chamber R3 becomes a hydraulically sealed space with the brake fluid fully filled therein. In other words, the area of the land portion 21y forming the rearward pressure receiving surface is set to be a predetermined size to maintain the pressure required for the forward movement of the power piston 21 to be a sufficient pressure level for closing the check valve 30. Therefore the closing operation of the check valve 30 is completed before a master cylinder hydraulic pressure is generated.

As mentioned previously, while the hydraulic pressure booster 20 is in the operated condition after the closed chamber R3 becomes the sealed space, the pushing pressure applied to the annular area of the land portion 21y and the pushing pressure applied to the front end surface of the power piston 21 by the hydraulic pressure of the closed chamber R3 are controlled in the well-balanced manner relative to the brake pedal depressing force and the pushing pressure applied rear end surface of the power piston 21. Because the effective cross-sectional area of the land portion 21x of the power piston 21 is larger than that of the master piston 12, the master piston 12 is moved forward corresponding to the forward movement of the power piston 21. Therefore, as shown in FIG. 3, the clearance between the master piston 12 and the power piston 21 is enlarged. The master piston 12 is hydraulically connected to the power piston 21 and can be moved as a unit. As described above, when the hydraulic pressure booster 20 is in the operated condition, the power piston 21 is hydraulically connected to the master piston 12 via the brake fluid filled in the closed chamber R3 and the two are moved together in the forward direction as a unit by the clearance defined between the pistons 21, 12. The forward movement of the power piston 21 and the master piston 12 as a unit can minimize a stroke of the brake pedal 3.

Should the hydraulic pressure booster 20 fail, the power hydraulic pressure is not fed into the fluid supply chamber R5 and the power chamber R6. The drain chamber R4 is connected to the reservoir 4 via the port 2d. The closed chamber R3 is connected to the reservoir 4 via the hydraulic passage 1k and the fluid supply port 1j. Therefore, the closed chamber R3 and the chambers R4, R, R6 are maintained at atmospheric pressure. Accordingly, corresponding to the forward movement of the input rod 3a by the operation of the brake pedal 3, the second spool 24 is moved forward via the plunger 22 and first spool 23 and set to be in contact with the reaction force disc 25. The master piston 12 is pressured forward via the reaction force disc 25 and the metal plate 26 and is moved forward integrally as shown in FIG. 4.

Figure 4:
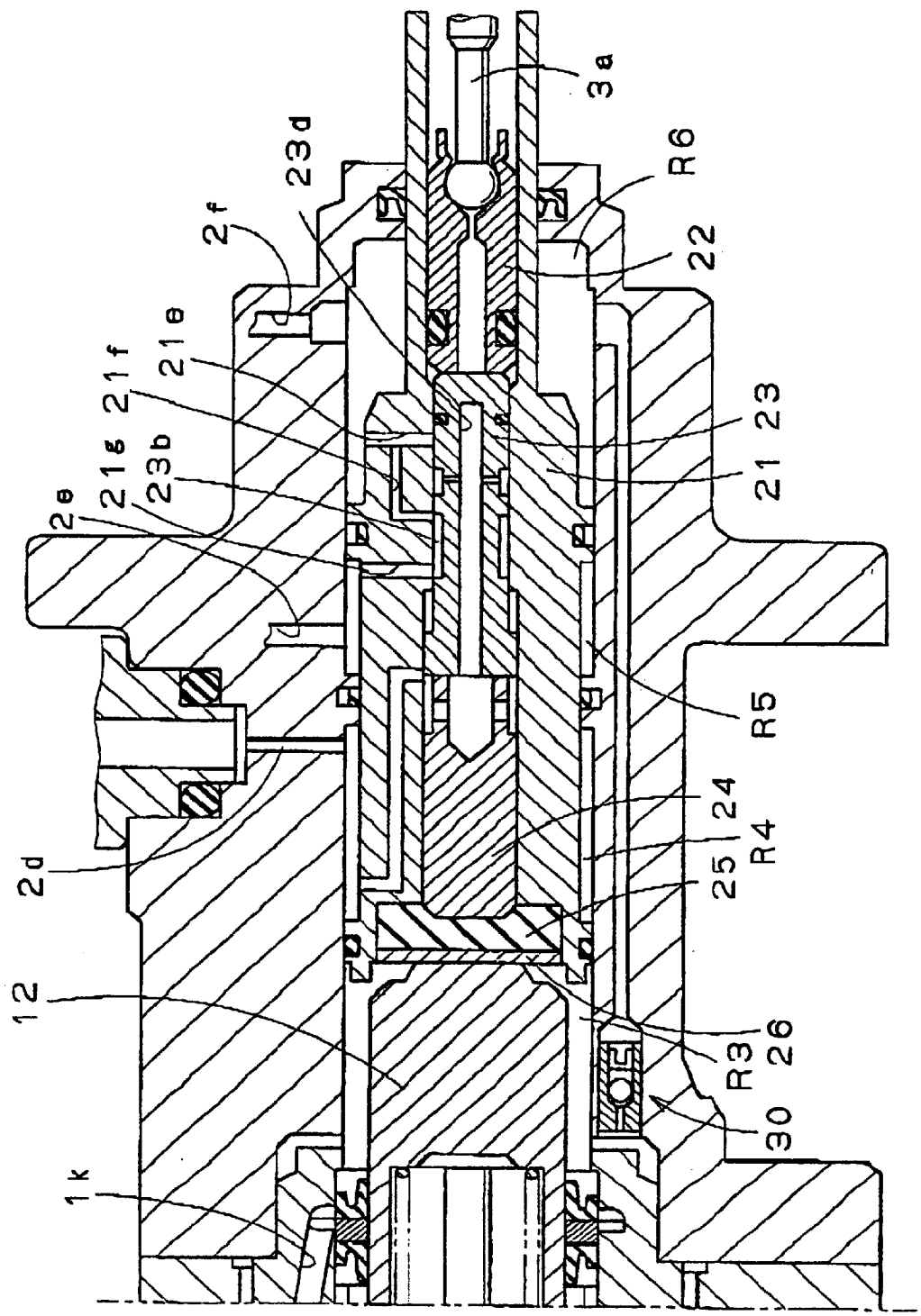
FIG. 4 is a cross-sectional view of a portion of the hydraulic pressure booster shown in FIG. 1 upon failure.

Under the above condition shown in FIG. 4, the brake hydraulic pressure is generated by the forward integral movement of the power piston 21 and the master piston 12. The generated brake hydraulic pressure is determined not by the effective cross-sectional area of the land portion 21x of the power piston 21, but by the effective cross-sectional area the master piston 12. Therefore, should the hydraulic pressure booster 20 fail, the hydraulic pressure increase gradient is increased compared with the hydraulic pressure increase gradient estimated under the effective cross-sectional area of the land portion 21x being equal to that of the master piston 12.

Figure 5:
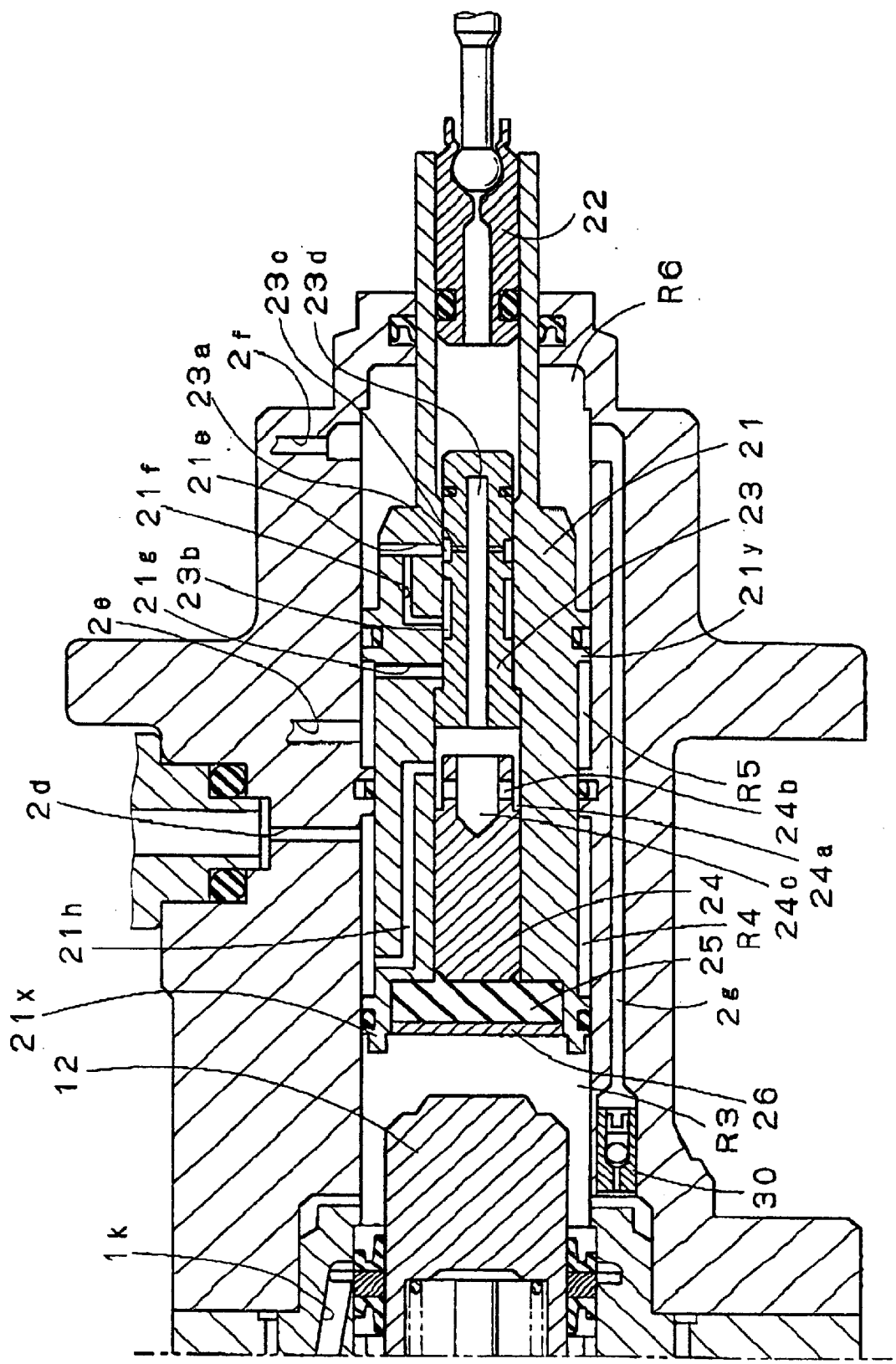
FIG. 5 is a cross-sectional view of a portion of the hydraulic pressure booster shown in FIG. 1 when an automatic brake operation is carried out.

FIG. 5 shows an active brake operation (an automatic brake operation). When the brake pedal 3 is under the non-operated condition, the auxiliary hydraulic pressure source 40 is activated with the solenoid valve 5 (shown in FIG. 1) being in the open position and the solenoid valve 6 (shown in FIG. 1) being in the closed position. As shown in FIG. 5, the position of the fist spool 23 and the second spool 24 at the initial state is the same as that shown in FIG. 2. The fluid supply chamber R5 is fed with the output power hydraulic pressure of the auxiliary hydraulic pressure source 40 while the communicating hole 21g is blocked by the first spool 23. Meanwhile, the power chamber R6 is connected to the drain port 2d via the communicating hole 21e, the groove 23a facing the communicating hole 21e, the communicating hole 23c, the hole 23d of the first spool 23, the hole 24c of the second spool 24, the communicating hole 24b, the groove 24a and the communicating hole 21h of the power piston 21. However, the power chamber R6 can be filled with brake hydraulic pressure with the solenoid valve 6 being at the closed position. In other words, the power chamber R6 is filled with power hydraulic pressure. Accordingly, the first spool 23 is maintained at the position shown in FIG. 5, with the hydraulic pressure being applied to the front end of the first spool 23. The second spool 24 is moved forward, being pushed by the power hydraulic pressure, wherein the forward moving force of the second spool 24 is applied to the reaction force disc 25. Therefore, there is a clearance defined between the first spool 23 and the second spool 24 as shown in FIG. 5.

Under the above condition, the hydraulic passage 2g is blocked by the check valve 30 with the check valve 30 being in the closed position corresponding to the pressure differential between the power chamber R6 and the closed chamber R3. When the hydraulic pressure in the closed chamber R3 is increased, the closed chamber R3 becomes the sealed space filled with brake fluid. Accordingly, the forward movement of the master pistons 11, 12 is urged by the pushing pressure which is applied to the effective cross-sectional area of the power piston 21 corresponding to the brake hydraulic pressure fed into the power chamber R6. As described above, when the brake pedal 3 is in the non-operated condition, a desired brake hydraulic pressure can be outputted by controlling the auxiliary hydraulic pressure source 40, the solenoid valves 5, 6 in response to the condition.

Figure 6:
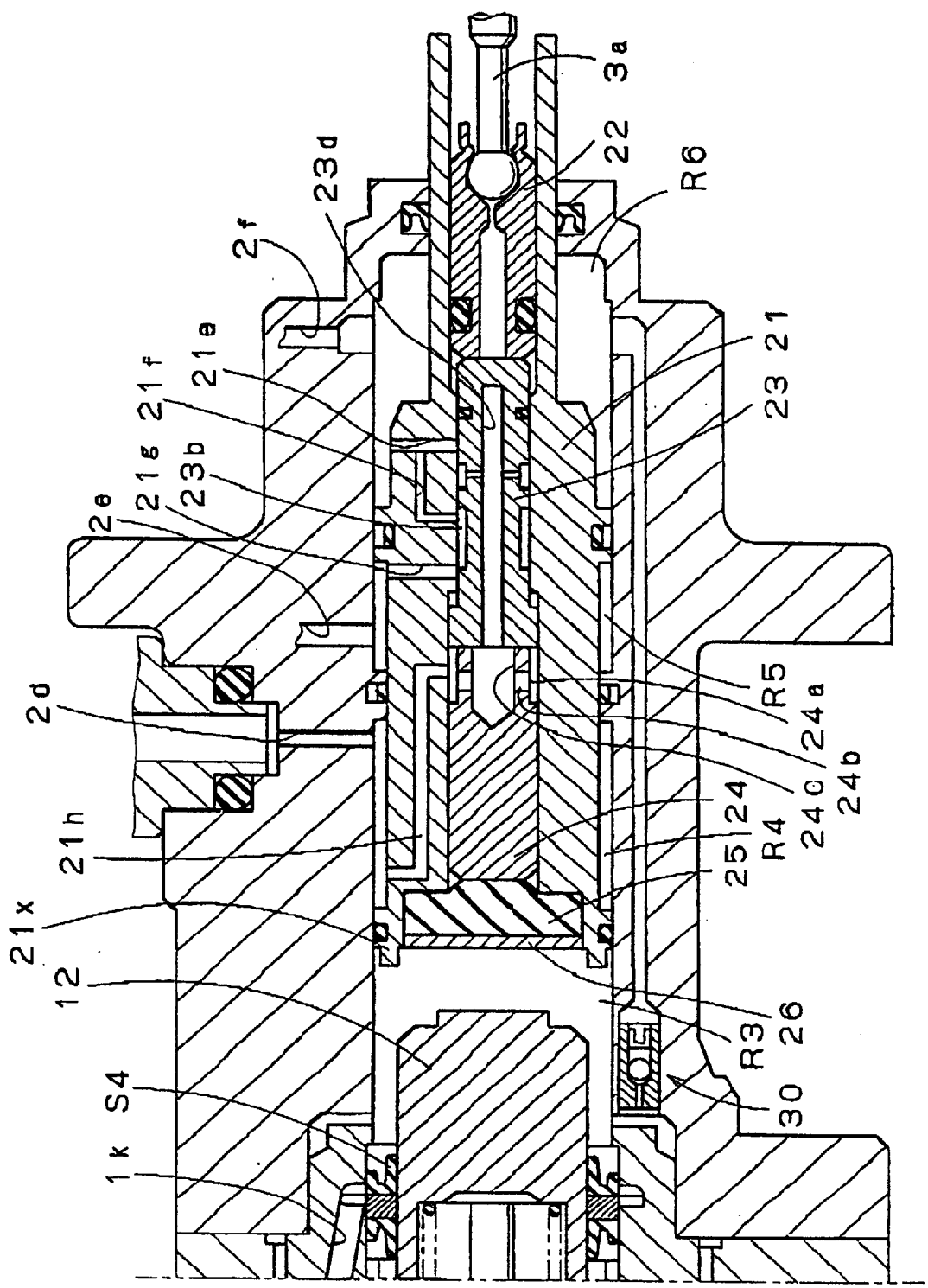
FIG. 6 is a cross-sectional view of a portion of the hydraulic pressure booster shown in FIG. 1 when the brake assisting operation is carried out.

FIG. 6 shows the operating condition when brake assisting is in the operated condition. When the brake pedal is operated, the first spool 23 is moved forward, being urged by the forward movement of the plunger 22 and set to be at the same position shown in FIG. 3. Although the communication between the power chamber R6 and the hole 23d is interrupted, the power hydraulic pressure is fed into the power chamber R6 via the fluid supply port 2e, the communicating hole 21g, the annular groove 23b, and the communicating holes 21e, 21f, with the annular groove 23b facing the opening portion of each of the communicating holes 21f, 21g. The explanation of the operation under this above condition is not repeated here for purposes of simplifying the description as the operation is the same as the one shown in FIG. 3.

Because the effective cross-sectional area of the land portion 21x is larger than that of the master piston 12, the forward movement of the master piston 12 is carried out corresponding to the forward movement of the power piston 21, wherein the clearance between the master piston 12 and the power piston 21 is expanded as shown in FIG. 6. Therefore, the master piston 12 can be hydraulically connected to the power piston 21 and moved as a unit. As described above, the power piston 21 can be hydraulically connected to the master piston 12 via the brake fluid filled in the closed chamber R3. The master piston 12 can be moved forward as a unit with the power piston 21. The brake hydraulic pressure is generated corresponding to the forward movement of the master pistons 11, 12. Under the above condition, the brake hydraulic pressure in the closed chamber R3 is transmitted to the brake pedal 3 via the metal plate 26 and the reaction force disc 25, wherein the reaction force is applied to the brake pedal 3.

Under the above condition, when the brake pedal 3 is operated at a speed which is equal to or greater than a predetermined speed, or when the brake pedal 3 is operated at an operating amount which is equal to or greater than a predetermined value, the solenoid valve 5 is controlled for opening and closing after the solenoid valve 6 (shown in FIG. 1) is set to be at the closing position. Accordingly, the output power hydraulic pressure of the auxiliary hydraulic pressure source 40 is fed into the fluid supply chamber R5 and the power chamber R6. Corresponding to the opening-closing operation of the solenoid valve 5, relative movement of the first spool 23 and the power piston 21 occurs. Accordingly, the brake hydraulic pressure generated under the above condition is equal to or greater than the hydraulic pressure generated when the normal brake assisting is being carried out. Therefore, a proper braking force can be assured even when the depressing force applied to the brake pedal 3 is not sufficiently carried out.

The hydraulic brake apparatus according to embodiment of the present invention described above is able to minimize the stroke of the brake pedal 3 when the hydraulic pressure booster 20 is in the operated condition. Even when the hydraulic pressure booster 20 fails, a large hydraulic pressure can be generated and so a desired braking force can be applied to the wheel cylinders provided at each wheel of the vehicle. Additionally, because the pressure regulating device is installed in the power piston 21, easy manufacturing and installation can be achieved. Also, the hydraulic pressure booster 20 can be configured with any device including a hydraulic pressure booster and a regulator.

Figure 7:
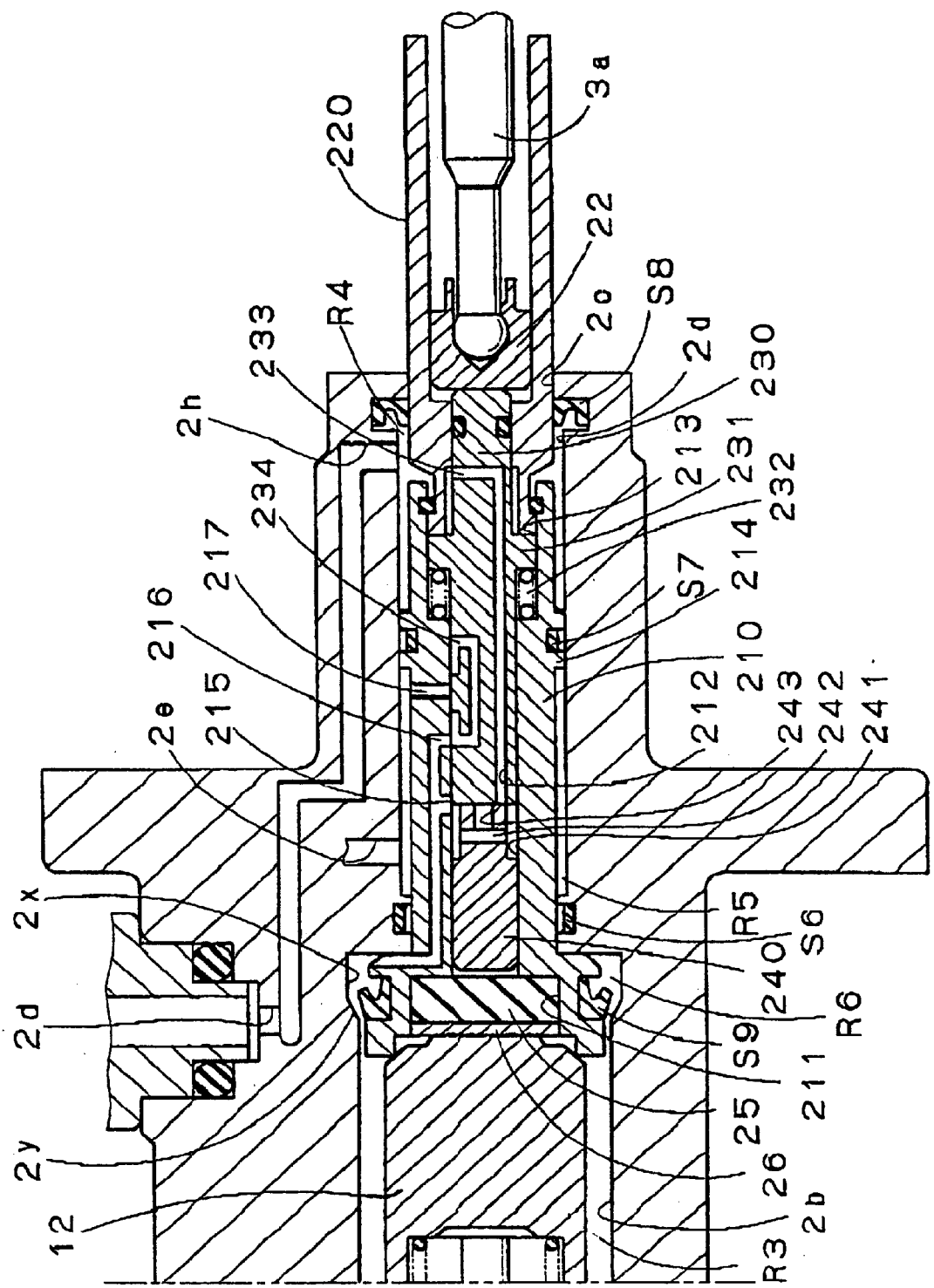
FIG. 7 is a cross-sectional view of a portion of the hydraulic pressure booster according to a second embodiment of the present invention.
Figure 8:
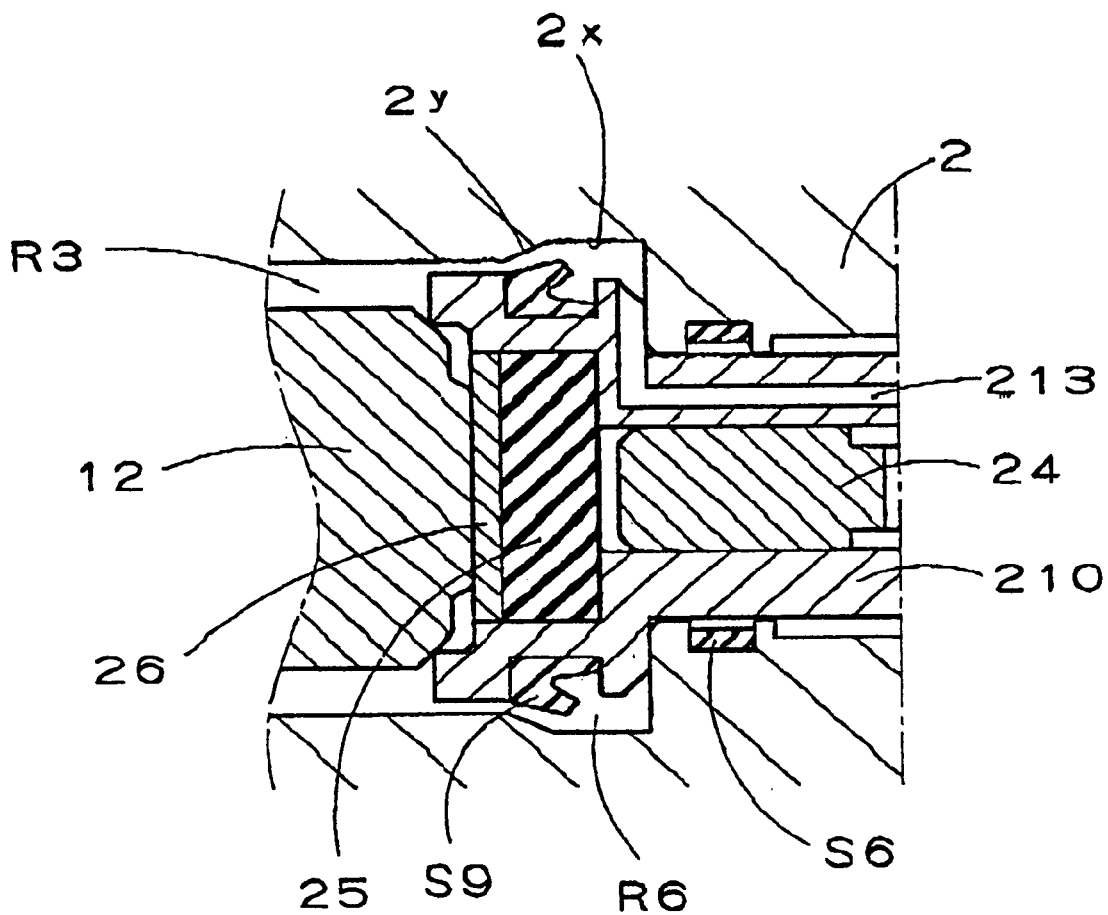
FIG. 8 is an enlarged cross-sectional view of the reaction force disc and its surrounding components used in the hydraulic pressure booster according to the second embodiment of the present invention.

The hydraulic pressure booster 20 according to a second embodiment of the present invention is illustrated in FIG. 7. Features illustrated in FIG. 7 that are the same as those associated wit the first embodiment are denoted by the same reference characters and a detailed description of such features is not repeated here. FIG. 8 is an enlarged view of the reaction force disc 25 and its surrounding components. According to the second embodiment, the valve function is configured with an annular cup-like sealing member S9 instead of the check valve 30 used in the first embodiment. The sealing member S9 is disposed at the front end portion of a power piston 210 instead of the sealing member S5 according to the first embodiment.

According to the second embodiment, the closed chamber R3 is defined between the sealing members S4 and S9, and the power chamber R6 is defined between the sealing members S9 and S6. The fluid supply chamber R5 is defined between the sealing members S6 and S7, and the drain chamber R4 is defined between the sealing members S7 and S8. The positions of the drain chamber R4 and the power chamber R6 according to the first embodiment are changed in the second embodiment. The drain chamber R4 is connected to the drain port 2d via a hydraulic passage 2h. The power chamber R6 is defined in a cylinder bore 2x having a larger diameter than that of the cylinder bore 2b. An inclined surface 2y is extended from the cylinder bore 2x and is defined on the inner wall of the cylinder bore 2b facing the sealing member S9.

Under the non-operated condition, a clearance is defined between the sealing member S9 and the inclined surface 2y as shown in FIGS. 7 and 8. A passage or communicating space thus exists that allows communication between the power chamber R6 and the closed chamber R3. Immediately after the forward movement of the power piston 210, the communication between the power chamber R6 and the closed chamber R3 is interrupted by virtue of the front edge of the sealing member S9 contacting the inclined surface 2y, wherein the closed chamber R3 becomes the sealed space filled with brake fluid.

The power piston 210 in the second embodiment is different from the power piston 21 according to the first embodiment in that the power piston 210 is divided into two portions and is connected with a cylinder 220 behind the power piston 210. The sealing member S7 is disposed in a land portion 214 provided on an outer surface of the power piston 210 at an axially middle portion. Stepped bores of the cylinder bores 2b, 2d are defined in the fourth cylinder 2a forming the booster housing 2. The sealing member S6 is disposed inside the small diameter cylinder bore 2d. The sealing member S8 is disposed around the opening portion 2c at the bottom portion of the fourth cylinder 2a. Therefore, the cylinder 220 is fluid-tightly and slidably disposed via the sealing member S8.

A recessed portion 211 and stepped bores of the cylinder bores 212, 213 are defined at a hollow portion of the power piston 210. A second spool 240 is slidably received in the small diameter cylinder bore 212. Communicating holes 215, 216 are defined in the power piston 210 for connecting the cylinder bore 212 with the power chamber R6, and a communicating hole 217 is defined in the power piston 210 for connecting the cylinder bore 212 with the fluid supply chamber R5. A first spool 230 is slidably disposed in the large diameter cylinder bore 213 defined in the power piston 210. A large diameter portion 231 is provided at an axially middle portion of the first spool 230. A spring 232 extends between the large diameter portion 231 and a front end of the cylinder bore 213, whereby the first spool 230 is always biased in the rearward direction.

The reaction force disc 25 is accommodated in the recessed portion 211 as the elastic member for transmitting the reaction force. There is a slight clearance defined between a front end surface of the second spool 240 and the reaction force disc 25. In a manner similar to the first embodiment, the metal plate 26 is disposed ahead of the reaction force member 25 and is axially movable.

The plunger 22 is slidably inserted into a hollow portion of the cylinder 220. A front end surface of the plunger 22 is in contact with a rear end surface of the first spool 230 and a rearward side of the plunger 22 is connected to the input rod 3a.

Several communicating holes 233, 234 are defined in the first spool 230. The communicating hole 233 is open at both the front and rear ends and is also open radially at a middle portion and communicates with the cylinder bore 213. An annular groove 241 is defined on the outer periphery of the second spool 240 and at the rearward portion of the second spool 240. An axially extending hole 243 defined at the rearward portion of the second spool 240 is connected to the power chamber R6 via a radial communicating hole 242, the annular groove 241 and the communicating hole 215. Under the non-operated condition shown in FIG. 7, the opening portion of the communicating hole 234 faces the opening portion of the groove 216. However, the communicating hole 217 is blocked by the first spool 230.

Corresponding to the forward movement of the first spool 230, the communicating hole 217 is connected to the power chamber R6 via the communicating hole 234 of the first spool 230 and the communicating hole 216. In other words, the power chamber R6 is connected to the fluid supply port 2e via the communicating holes 216, 234, 217. Therefore, the output brake hydraulic pressure of the auxiliary hydraulic pressure source 40 is fed into the power chamber R6 connected to the auxiliary hydraulic pressure source 40 via the fluid supply port 2e, wherein communication between the power chamber R6 and the closed space R3 is interrupted by the sealing member S9.

Figure 9:
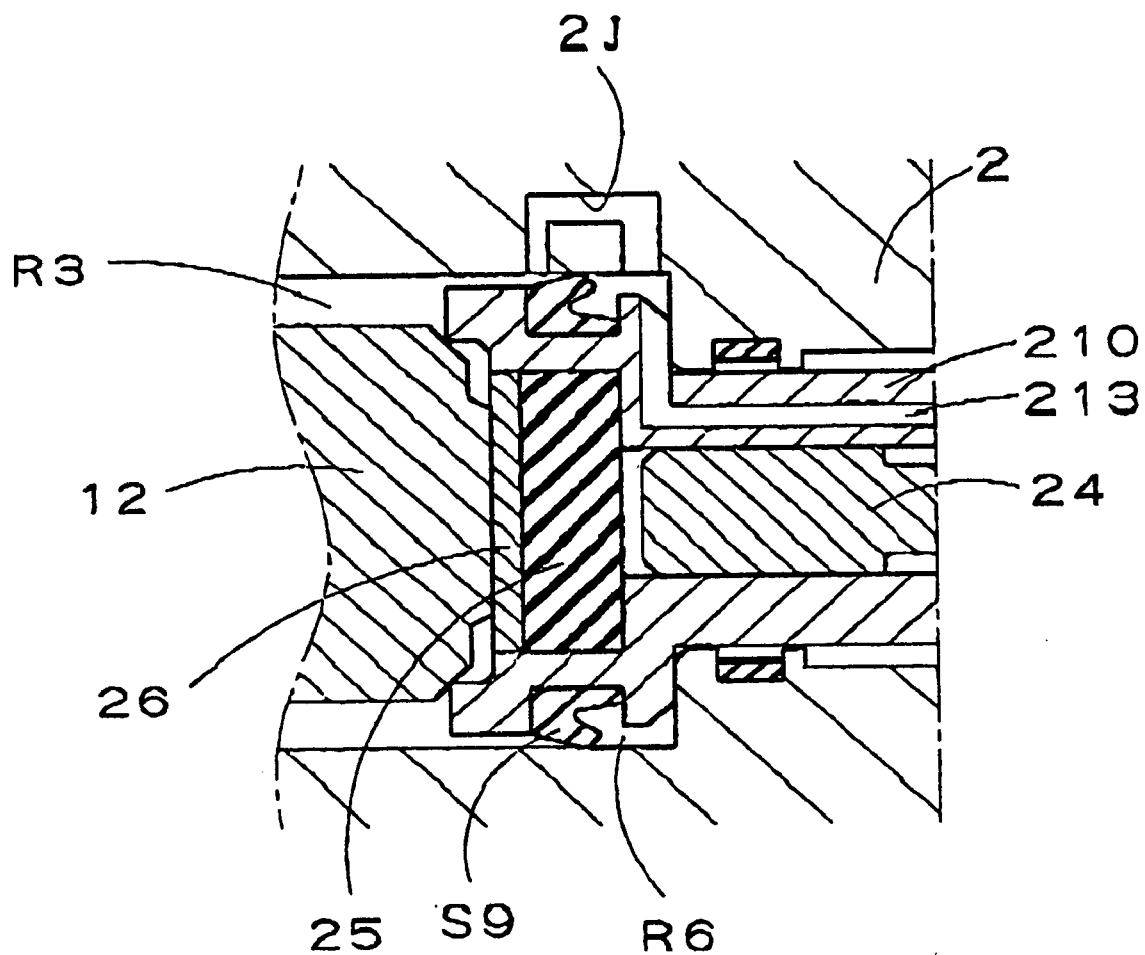
FIG. 9 is an enlarged cross-sectional view of the reaction force disc and its surrounding components according to a third embodiment of the present invention.

FIG. 9 shows an enlarged view of the reaction force disc 25 and its surrounding components according to the third embodiment of the present invention. According to this third embodiment, under the non-operated condition, a bypass 2j is defined in the booster housing 2 instead of the inclined surface 2y according to the second embodiment shown in FIG. 8. The bypass 2j connects the power chamber R6 to the closed chamber R3, thus forming a communicating space or passage. As shown in FIG. 9. under the non-operated condition, the power chamber R6 is connected to the closed chamber R3 via the bypass 2j opening on both axial sides of the sealing member S9. Corresponding to the forward movement of the power piston 210, the communication between the power chamber R6 and the closed chamber R3 is interrupted by both opening portions of the hydraulic passage 2j being positioned in or communicated with the power chamber P6.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A hydraulic brake apparatus for a vehicle comprising:
   a brake operating member;
   a reservoir;
   a master cylinder for generating a brake hydraulic pressure by increasing a pressure of the brake fluid from the reservoir;
   a master piston provided in the master cylinder and movable in the master cylinder in response to operation of the brake operating member;
   a power piston disposed behind the master piston;
   a closed chamber defined between the master piston and the power piston;
   a power chamber defined by the power piston;
   an auxiliary hydraulic pressure source for generating a power hydraulic pressure by increasing the pressure of the brake fluid from the reservoir to a predetermined hydraulic pressure;
   a pressure regulating device connected to the auxiliary hydraulic pressure source and to the reservoir, with the power hydraulic pressure from the auxiliary hydraulic pressure source being regulated to a predetermined hydraulic pressure and fed into the power chamber; and
   normally-open type valve means for connecting the closed chamber and the power chamber and operable to a closed condition in response to initiation of operation of the brake operating member, with the closed chamber being connected to the reservoir via the normally-open type valve means, the power chamber and the pressure regulating device, and with communication between the closed chamber and the power chamber being interrupted by operation of the normally-open type valve means to the closed condition to thereby interrupt communication between the closed chamber and the reservoir.

2. The hydraulic brake apparatus for a vehicle according to claim 1, wherein the normally-open type valve means is a normally-open type check valve that is operated in response to a pressure differential between the power chamber and the closed chamber, the communication between the power chamber and the closed chamber being established when the pressure differential between the power chamber and the closed chamber is less than a predetermined value, the communication between the power chamber and the closed chamber being interrupted when the pressure differential between the power chamber and the closed chamber is equal to or greater than the predetermined value.

3. The hydraulic brake apparatus for a vehicle according to claim 1, including a cup-shaped sealing member disposed at a front end of the power piston and forming the normally-open type valve means, the communication between the closed chamber and the power chamber being established by bypassing a front end portion of the sealing member during non-operation of the brake operating member and the communication between the closed chamber and the power chamber being interrupted by the sealing member upon forward movement of the power piston at initiation of operation of the brake operating member.

4. The hydraulic brake apparatus for a vehicle according to claim 1, wherein the power piston possesses a pressure receiving surface for retracting the power piston based on the power hydraulic pressure supplied from the auxiliary hydraulic pressure source, an area of the pressure receiving surface being set to be a predetermined size to maintain a pressure required for the forward movement of the power piston to be a sufficient pressure level for closing the normally-open type valve means when the brake operation member is operated.

5. The hydraulic brake apparatus for a vehicle according to claim 1, wherein the pressure regulating device is formed in the power piston.

6. The hydraulic brake apparatus for a vehicle according to claim 1, further comprising:

a normally-closed type solenoid valve connecting the power chamber to the auxiliary hydraulic pressure source via a fluid passage; and a normally-open type solenoid valve connecting the pressure regulating device to the reservoir via a fluid passage, the normally-closed type solenoid valve and the normally-open type solenoid valve being activated for opening and closing respectively when the auxiliary hydraulic pressure source is operated under an automatic braking operation.

7. A hydraulic brake apparatus for a vehicle comprising:

a brake operating member;

a reservoir;

a master piston movably positioned within a cylinder bore to move in response to operation of the brake operating member;

a closed chamber located rearward of the master piston;

a power piston disposed rearward of the master piston;

a power chamber defined by the power piston and two sealing members;

a passage connecting the power chamber and the closed chamber;

an auxiliary hydraulic pressure source including a pump connected to the reservoir to generate power hydraulic pressure by increasing the pressure of the brake fluid from the reservoir to a predetermined hydraulic pressure;

a pressure regulating device connected to the auxiliary hydraulic pressure source and to the reservoir to regulate the power hydraulic pressure from the auxiliary hydraulic pressure source to a predetermined hydraulic pressure and feed the regulated power hydraulic pressure to the power chamber; and a valve located in the passage and operable to a closed condition to close off the passage and interrupt communication between the power chamber and the closed chamber by way of the passage based on either movement of the power piston or a pressure differential between the power chamber and the closed chamber, the closed chamber being connected to the reservoir via the valve, the power chamber and the pressure regulating device, with operation of the valve to the closed condition interrupting communication between the closed chamber and the reservoir.

8. The hydraulic brake apparatus for a vehicle according to claim 7, wherein the valve is a normally-open type check valve that is operated in response to a pressure differential between the power chamber and the closed chamber, the communication between the power chamber and the closed chamber being established by way of the check valve when the pressure differential between the power chamber and the closed chamber is less than a predetermined value, and the communication between the power chamber and the closed chamber being interrupted by way of the valve when the pressure differential between the power chamber and the closed chamber is equal to or greater than the predetermined value.

9. The hydraulic brake apparatus for a vehicle according to claim 7, wherein the valve is a sealing member.

10. The hydraulic brake apparatus for a vehicle according to claim 9, wherein the cylinder bore in which is positioned the master piston includes an inclined surface, the sealing member being spaced from the inclined surface to define the passage, the sealing member engaging the inclined surface during forward movement of the power piston upon operation of the brake operating member to close the passage.

11. The hydraulic brake apparatus for a vehicle according to claim 9, wherein the sealing member is a cup-shaped sealing member.

12. The hydraulic brake apparatus for a vehicle according to claim 9, wherein the sealing member is mounted on a front end of the power piston and is movable with the power piston, with communication between the closed chamber and the power chamber being permitted by bypassing a front end portion of the sealing member during non-operation of the brake operating member and communication between the closed chamber and the power chamber being interrupted by the sealing member upon forward movement of the power piston at initiation of operation of the brake operating member.

13. The hydraulic brake apparatus for a vehicle according to claim 7, wherein the power piston possesses a pressure receiving surface for retracting the power piston based on the power hydraulic pressure supplied from the auxiliary hydraulic pressure source, an area of the pressure receiving surface being set to be a predetermined size to maintain a pressure required for the forward movement of the power piston to be a sufficient pressure level for closing the normally-open type valve when the brake operation member is operated.

14. The hydraulic brake apparatus for a vehicle according to claim 7, wherein the pressure regulating device is formed in the power piston.

15. The hydraulic brake apparatus for a vehicle according to claim 7, including a normally-closed type solenoid valve connecting the power chamber to the auxiliary hydraulic pressure source via a fluid passage, the normally-closed type solenoid valve being activated for opening when the auxiliary hydraulic pressure source is operated under an automatic braking operation.

16. The hydraulic brake apparatus for a vehicle according to claim 7, including a normally-open type solenoid valve connecting the pressure regulating device to the reservoir via a fluid passage, the normally-open type solenoid valve being activated for closing when the auxiliary hydraulic pressure source is operated under an automatic braking operation.

17. A hydraulic brake apparatus for a vehicle comprising:

a brake operating member;

a reservoir;

a master piston movably positioned within a housing and movable in response to operation of the brake operating member;

a closed chamber located rearward of the master piston;

a power piston disposed rearward of the master piston;

a power chamber defined by the power piston and in communication with the closed chamber by way of a communicating space;

an auxiliary hydraulic pressure source including a pump connected to the reservoir to generate power hydraulic pressure;

a pressure regulating device connected to the auxiliary hydraulic pressure source and to the reservoir to regulate the power hydraulic pressure from the auxiliary hydraulic pressure source to a predetermined hydraulic pressure and feed the regulated power hydraulic pressure to the power chamber; and a normally open valve operable to a closed condition to close the communicating space and interrupt communication between the power chamber and the closed chamber upon operation of the brake operating member, the closed chamber being communicated with the reservoir by way of the normally open valve, with the communication between the closed chamber and the reservoir being interrupted by operation of the normally open valve to the closed condition.

18. The hydraulic brake apparatus for a vehicle according to claim 17, wherein the closed chamber is connected to the reservoir via the valve, the power chamber and the pressure regulating device.

19. The hydraulic brake apparatus for a vehicle according to claim 17, wherein the normally open valve is a check valve that is operated in response to a pressure differential between the power chamber and the closed chamber, the communication between the power chamber and the closed chamber being established when the pressure differential between the power chamber and the closed chamber is less than a predetermined value, the communication between the power chamber and the closed chamber being interrupted when the pressure differential between the power chamber and the closed chamber is equal to or greater than the predetermined value.

20. The hydraulic brake apparatus for a vehicle according to claim 17, wherein the normally open valve is a cup-shaped sealing member disposed at a front end of the power piston, the communication between the closed chamber and the power chamber being established by bypassing a front end portion of the sealing member during non-operation of the brake operating member and the communication between the closed chamber and the power chamber being interrupted by the sealing member upon forward movement of the power piston at initiation of operation of the brake operating member.

* * * * *